United States Patent
Foster et al.

(10) Patent No.: US 7,065,761 B2
(45) Date of Patent: Jun. 20, 2006

(54) NONVOLATILE LOGICAL PARTITION SYSTEM DATA MANAGEMENT

(75) Inventors: Robert Kimberlin Foster, Austin, TX (US); Van Hoa Lee, Cedar Park, TX (US); Timothy Albert Smith, Austin, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 09/798,204

(22) Filed: Mar. 1, 2001

(65) Prior Publication Data
US 2002/0124040 A1    Sep. 5, 2002

(51) Int. Cl.
*G06F 9/46* (2006.01)

(52) U.S. Cl. ............. 718/100; 711/173; 711/208; 710/3; 710/8; 710/36; 710/200; 712/1; 714/4; 714/23; 714/27; 709/201; 709/221

(58) Field of Classification Search ............ 718/1–108; 711/173, 208; 710/3, 8, 36, 200; 712/1; 714/4, 23, 27; 709/201, 221
See application file for complete search history.

(56) References Cited

U.S. PATENT DOCUMENTS

| | | | | |
|---|---|---|---|---|
| 4,843,541 A | * | 6/1989 | Bean et al. | 710/36 |
| 5,253,344 A | * | 10/1993 | Bostick et al. | 710/8 |
| 5,471,609 A | * | 11/1995 | Yudenfriend et al. | 714/4 |
| 5,564,040 A | * | 10/1996 | Kubala | 711/173 |
| 5,659,756 A | * | 8/1997 | Hefferon et al. | 710/200 |
| 5,704,055 A | * | 12/1997 | George et al. | 711/2 |
| 5,754,853 A | * | 5/1998 | Pearce | 713/2 |
| 5,765,210 A | * | 6/1998 | Greenstein et al. | 711/208 |
| 5,784,617 A | * | 7/1998 | Greenstein et al. | 718/104 |
| 5,784,702 A | * | 7/1998 | Greenstein et al. | 711/173 |
| 5,805,880 A | * | 9/1998 | Pearce et al. | 713/2 |
| 5,819,061 A | * | 10/1998 | Glassen et al. | 718/1 |
| 5,854,896 A | * | 12/1998 | Brenner et al. | 709/221 |
| 5,923,890 A | * | 7/1999 | Kubala et al. | 712/1 |
| 5,933,633 A | * | 8/1999 | Good et al. | 717/131 |
| 5,941,943 A | * | 8/1999 | Brenner et al. | 709/201 |

(Continued)

FOREIGN PATENT DOCUMENTS

EP    0593874    4/1994

OTHER PUBLICATIONS

Brio et al., "Neural Networks for Logical Partitioning of ATM Networks", IEEE, May 1996, pp. 745-749.*

(Continued)

*Primary Examiner*—Meng-Al T. An
*Assistant Examiner*—Jennifer N. To
(74) *Attorney, Agent, or Firm*—Sawyer Law Group LLP

(57) ABSTRACT

A logical partition (LPAR) computer system for managing partition configuration data is disclosed, which includes a nonvolatile memory, and a plurality of logical partitions, each running independently from the other logical partitions. The system also includes a console coupled to the computer system for accepting logical partition configuration data input by an operator. The configuration data entered by the operator specifies the processors, I/O, and memory allocated to each logical partition defined for the system. The system further includes a set of tables maintained in the nonvolatile memory for storing the logical partition configuration data, such that the logical partition configuration data is persistent across system power cycles.

21 Claims, 1 Drawing Sheet

U.S. PATENT DOCUMENTS 5,974,567 A * 10/1999 Dickson et al. .............. 714/27
5,996,026 A * 11/1999 Onodera et al. .............. 710/3
6,081,879 A *  6/2000 Arnott ....................... 711/173
6,098,113 A *  8/2000 Heil et al. .................. 710/1
6,101,617 A *  8/2000 Burckhartt et al. .......... 714/23
6,401,183 B1 *  6/2002 Rafizadeh ................... 711/173

OTHER PUBLICATIONS

Trimberger et al., "Placement-Based Partitioning for Lookup-Table-Based FPGAs", IEEE, Apr. 1992, pp. 91-94.*

* cited by examiner

NONVOLATILE LOGICAL PARTITION SYSTEM DATA MANAGEMENT

FIELD OF THE INVENTION

The present invention relates to multiprocessor computer systems, and more particularly to a system and method for managing logical partition data.

BACKGROUND OF THE INVENTION

Logical partitioning is the ability to make a single multiprocessing system run as if it were two or more independent systems. Each logical partition represents a division of resources in the system and operates as an independent logical system. Each partition is logical because the division of resources may be physical or virtual. An example logical partitions is the partitioning of a multiprocessor computer system into multiple independent servers, each with it own processors, main storage, and I/O devices.

An operator configures the system into logical partitions by assigning system resources to the desired partitions. Once system power is interrupted, however, either expectedly or unexpectedly, the configuration is lost, causing the operator to manually reconfigure all the logical partitions.

Accordingly, what is needed is a system and method for managing the configuration of the system resources allocated to each logical partition and to have that configuration data be persistent across system power cycles. The present invention addresses such a need.

SUMMARY OF THE INVENTION

The present invention provides a logical partition (LPAR) computer system with a method for managing partition configuration data. The system includes a nonvolatile memory, and a plurality of logical partitions, each running independently from the other logical partitions. The system also includes a console coupled to the computer system for accepting logical partition configuration data input by an operator. The configuration data entered by the operator specifies the processors, I/O, and memory allocated to each logical partition defined for the system. The system further includes a set of tables maintained in the nonvolatile memory for storing the logical partition configuration data, such that the logical partition configuration data is persistent across system power cycles.

Accordingly, the present invention provides nonvolatile memory tables that allow an operator to initially configure the LPAR system, and to later reconfigure the system. After the configuration, the tables provide the LPAR system with the information necessary to determine how the system is to be partitioned and booted.

DESCRIPTION OF THE INVENTION

Figure 1:
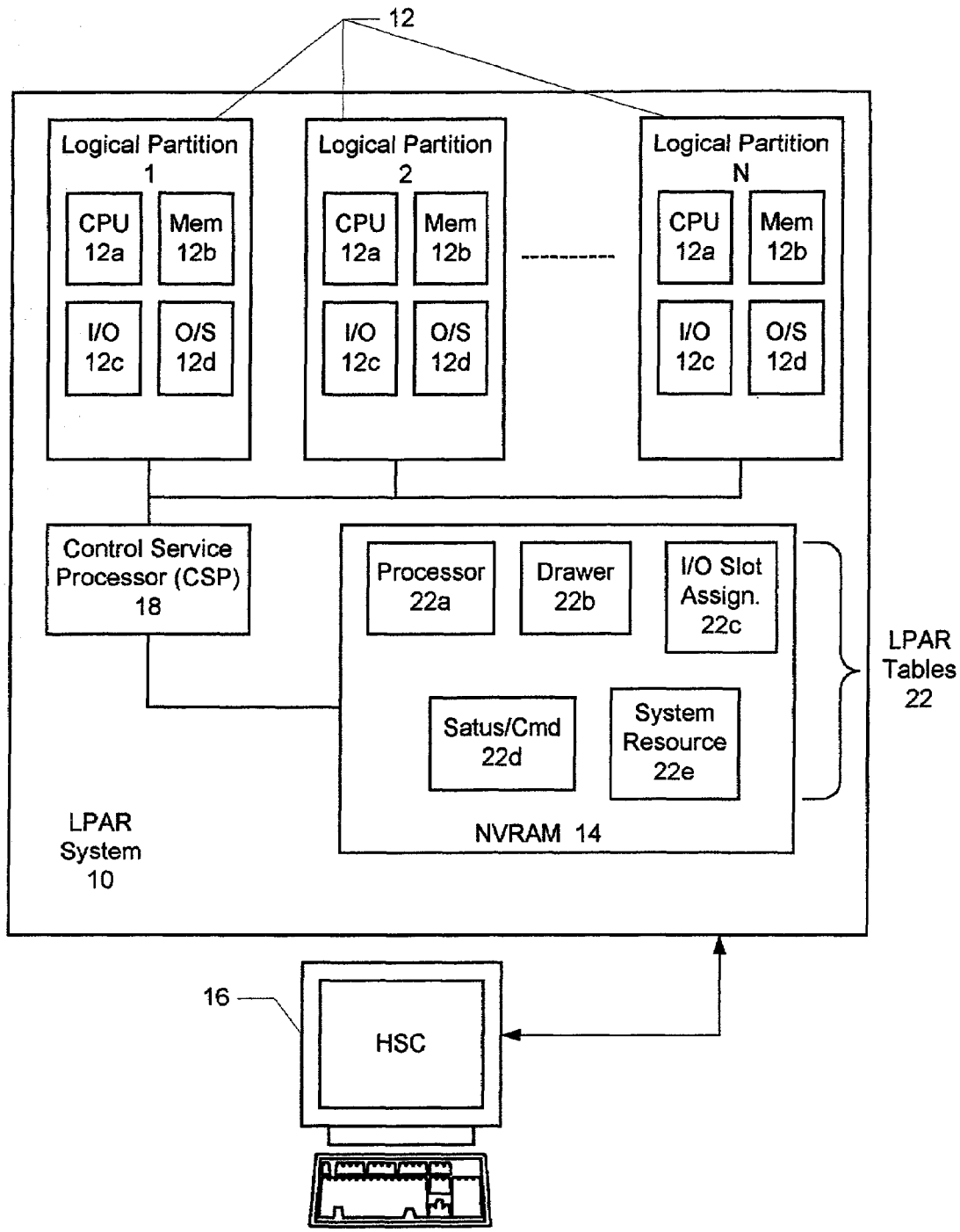
FIG. 1 is a block diagram illustrating a block diagram of a logical partition computer system in accordance with a preferred embodiment of the present invention.

The present invention relates to providing a logical partition computer system with a method for managing partition system data. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

FIG. 1 is a block diagram illustrating a block diagram of a logical partition (LPAR) computer system in accordance with a preferred embodiment of the present invention. The system 10 includes multiple processors 12a, large amount of memory 12b, and many I/O devices 12b. These hardware resources of the system 10 may be divided into logical partitions 12 that operate as independent logical systems. Each logical partition 12 has its own processor(s) 12a, memory 12b, and I/O devices 12c, and may run its own operating system 12d independently of the other logical partitions 12. In a preferred embodiment, the system 10 may have up to sixteen logical partitions 12.

The system 10 also includes a control service processor 18, a nonvolatile random access memory (NVRAM) 14, and an external hardware service console (HSC) 16. In a preferred embodiment, the HSC 16 may be implemented using a conventional PC running the Linux™ operating system, and appropriate application software.

The processors 12a for the system are arranged in processor nodes (not shown). Multiple processor nodes are mounted in frames, which contain and provide power for the processors 12a, switches, disk drives and other hardware. Frames have locations known as drawers that have some maximum number of slots into which the processor nodes, I/O devices 12b, and memory 12b boards are mounted.

Using the HSC 16, an operator configures the system 10 into logical partitions 12 by assigning system resources to the desired partitions. In a conventional LPAR system 10, however, once system power is interrupted, the configuration is lost, causing the operator to manually reconfigure all the logical partitions.

The present invention provides an operator with a method for managing the configuration of the system resources allocated to each logical partition 12. The present invention also allows the control service processor 18 to determine how the entire system 10 should be started. The method and system include providing a set of tables 22 in the NVRAM 14 for storing which processors 12a, I/O devices 12b, and memory 12c are allocated to each logical partition 12 defined for the system 10. Because the configuration of the system resources is stored in the NVRAM 14, the configuration data remains persistent across system 10 power cycles. In addition, the operator may reconfigure the system 10 by reallocating the system resources in the tables 22 through the HSC 16.

In one preferred embodiment, the tables 22 include a processor table 22a, a drawer table 22b, an I/O slot assignment table 22c, a partition status/command table 22d, and a system resource table 22e. The processor table 22a maintains a record for each of the processors 12a in the system 10. Each record may include fields containing an ID of the logical partition 12 assigned to the processor 12a, a physical location ID, a processor status, and a processor state, for instance.

The drawer table 22b includes a record for each drawer in the system 10 and may include fields for containing the drawer status, and the number of slots. The I/O slot assignment table 22c includes a record for each slot in the system 10, and may include fields for containing a location code, an I/O device ID, and an ID of the partition 12 assigned to the slot.

The partition status/command table 22d includes a record for each partition 12, and may include fields for containing a command state of the partition, a current command for the partition, and a last command for the partition, for instance. The system resource table 22e maintains information regarding the resources available for the system 10. The system resource table 22e may include fields for containing a maximum number of slots, a maximum number of processors 12, a maximum number of drawers, a maximum number of slots for any drawer type, total memory installed, total memory allocated for the logical partitions 12, and system time information, for example.

In operation, when the system 10 is first booted, the tables 22 are initialized to contain predetermined default values. During the boot process, system code running in the command service processor 18 detects the system resources (e.g., number of processors 12a, memory 12b, drawers, slots, I/O devices 12c and so on) in the system, and updates the corresponding records and fields in the tables 22.

After the system 10 has finished its boot process, arrived at a partition stand-by state, and ready to instantiate partitions, an operator can access the tables via the HSC 16 to configure the system resources into logical partitions 12. As the operator enters the configuration data defining what system resources are allocated to which logical partitions 12, the corresponding records and fields in the tables 22 are updated with the configuration data. After configuring the system, the operator may enter a "boot partition" command on the HSC to boot one or all of the logical partitions 12. In response, software running in the command service processor 18 accesses the tables 22 and boots the logical partitions using the information from the tables.

The NVRAM LPAR tables 22 allow an operator through the HSC interface, to initially configure the LPAR system 10, and to later reconfigure the system. After the configuration, the NVRAM LPAR tables 22 provide the control service processor 18 with the information necessary to determine how the system is to be partitioned and booted.

A system and method for managing logical partition data has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A logical partition (LPAR) computer system, comprising:
   nonvolatile memory;
   a plurality of logical partitions, each running independently from the other logical partitions, wherein each logical partition has its own processor, I/O, and memory;
   a console coupled to the computer system for accepting logical partition configuration data input by an operator, wherein the logical partition configuration data entered by the operator includes the processor, I/O, and memory allocated to each logical partition defined for the system; and
   a set of tables maintained in the nonvolatile memory for storing the logical partition configuration data such that the logical partition configuration data is persistent across system power cycles.

2. The LPAR system of claim 1 wherein processors for the system are arranged in processor nodes, with multiple processor nodes mounted in flames, the frames further including drawers, each having a plurality of slots into which the processor nodes, I/O devices, and memory boards are mounted.

3. The LPAR system of claim 2 wherein the tables include a processor table, a drawer table, an I/O slot assignment table, a partition status/command table, and a system resource table.

4. The LPAR system of claim 3 wherein the processor table maintains a record for each of the processors in the system, each record including fields containing an ID of the logical partition assigned to the processor, a physical location ID, a processor status, and a processor state.

5. The LPAR system of claim 3 wherein the drawer table includes a record for each drawer in the system, each record including fields for containing the drawer status, and the number of slots.

6. The LPAR system of claim 3 wherein the I/O slot assignment table includes a record for each slot in the system, each record including fields for containing a location code, an I/O device ID, and an ID of the partition assigned to the slot.

7. The LPAR system of claim 3 wherein the partition status/command table includes a record for each partition, each record including fields for containing a command state of the partition, a current command for the partition, and a last command for the partition, for instance.

8. The LPAR system of claim 3 wherein the system resource table maintains information regarding the resources available for the system, and includes fields for containing a maximum number of slots, a maximum number of processors, a maximum number of drawers, a maximum number of slots for any drawer type, total memory installed, total memory allocated for the logical partitions, and system time information.

9. The LPAR system of claim 1 wherein when the system is first booted, the tables are initialized to contain predetermined default values.

10. The LPAR system of claim 9 wherein during the boot process the system resources in the system are detected, and the corresponding records and fields in the tables are updated.

11. The LPAR system of claim 10 wherein as the operator enters the configuration data defining what system resources are allocated to which logical partitions, the corresponding records and fields in the tables are updated with the configuration data.

12. The LPAR system of claim 11 wherein after configuring the system, the operator may enter a boot partition command on the console to boot one or all of the logical partitions, and in response, the system accesses the tables and boots the logical partitions using the information from the tables.

13. A method for managing logical partition data in a multiprocessor computer system, the method comprising the steps of:
   (a) providing a set of tables in nonvolatile memory for storing processor, I/O, and memory allocated to each logical partition defined for the system, wherein each logical partition has its own processor, I/O, and memory;
   (b) initializing the tables to contain predetermined default values when the system is first booted;

(c) detecting the system resources in the system during the boot process, and updating corresponding records and fields in the tables; and (d) allowing an operator to configure the system by reallocating system resources in the tables through a console interface.

14. The method of claim 13 wherein step (b) further includes the step: of as the operator enters the configuration data defining what system resources are allocated to which logical partitions, updating the corresponding records and fields in the tables with the configuration data.

15. The method of claim 14 further includes the step of:

(c) in response to the operator entering a boot partition command on the console to boot one or all of the logical partitions, accessing the tables and booting the logical partitions using the information from the tables.

16. The method of claim 13 wherein step (a) further includes the step of: providing a processor table, a drawer table, an I/O slot assignment table, a partition status/command table, and a system resource table.

17. A computer-readable medium containing program instructions for managing logical partition data in a multiprocessor computer system, the program instructions for:

(a) providing a set of tables in nonvolatile memory for storing processor, I/O, and memory allocated to each logical partition defined for the system, wherein each logical partition has its own processor, I/O, and memory;

(b) initializing the tables to contain predetermined default values when the system is first booted;

(c) detecting the system resources in the system during the boot process, and updating corresponding records and fields in the tables; and (d) allowing an operator to configure the system by reallocating system resources in the tables through a console interface.

18. The computer readable medium of claim 17 wherein instruction (b) further includes the instruction of: as the operator enters the configuration data defining what system resources are allocated to which logical partitions, updating the corresponding records and fields in the tables with the configuration data.

19. The computer readable medium of claim 18 further includes the instruction of:

(c) in response to the operator entering a boot partition command on the console to boot one or all of the logical partitions, accessing the tables and booting the logical partitions using the information from the tables.

20. The computer readable medium of claim 17 wherein instruction (a) further includes the instruction of: providing a processor table, a drawer table, an I/O slot assignment table, a partition status/command table, and a system resource table.

21. A logical partition (LPAR) computer system, comprising:

nonvolatile memory;

a plurality of logical partitions, each running independently from the other logical partitions, wherein each logical partition has its own processor, I/O, and memory;

a console coupled to the computer system for accepting logical partition configuration data input by an operator, wherein the logical partition configuration data entered by the operator includes the processor, I/O, and memory allocated to each logical partition defined for the system; and a set of tables maintained in the nonvolatile memory for storing the logical partition configuration data such that the logical partition configuration data is persistent across system power cycle, wherein one of the tables maintains information regarding the resources available for the system, and includes fields for containing a maximum number of slots, a maximum number of processors, a maximum number of drawers, a maximum number of slots for any drawer type, total memory installed, total memory allocated for the logical partitions, and system time information.

* * * * *

UNITED STATES PATENT AND TRADEMARK OFFICE
CERTIFICATE OF CORRECTION

| | |
|---|---|
| PATENT NO. | : 7,065,761 B2 |
| APPLICATION NO. | : 09/798204 |
| DATED | : June 20, 2006 |
| INVENTOR(S) | : Foster et al. |

It is certified that error appears in the above-identified patent and that said Letters Patent is hereby corrected as shown below:

In column 4, line 5, delete "flames" and replace with -- frames --.

Signed and Sealed this

Twenty-first Day of November, 2006

JON W. DUDAS
*Director of the United States Patent and Trademark Office*